| United States Patent [19] | [11] Patent Number: 4,717,710 |
| Shimizu et al. | [45] Date of Patent: Jan. 5, 1988 |

[54] THERMOCHROMIC COMPOSITION

[75] Inventors: Goro Shimizu, Shiga; Yoshimi Hayashi, Kyoto, both of Japan

[73] Assignees: Matsui Shikiso Chemical Co. Ltd.; Sanrio Company, Ltd., both of Japan

[21] Appl. No.: 688,629

[22] Filed: Jan. 3, 1985

[51] Int. Cl.⁴ .................... G03C 1/733; G01K 11/12
[52] U.S. Cl. .................... 503/213; 252/408.1; 252/600; 252/962; 252/586; 428/913; 374/162; 116/207; 106/311
[58] Field of Search ............... 252/586, 600, 364, 962, 252/408.1; 8/657, 938; 503/213; 106/311; 374/162; 116/200, 207

[56] References Cited

U.S. PATENT DOCUMENTS

| | | |
|---|---|---|
| 3,539,375 | 11/1970 | Baum .................................... 117/36.2 |
| 3,705,037 | 12/1972 | Inoue et al. ...................... 252/586 X |
| 3,741,628 | 6/1973 | Margerum ...................... 252/586 X |
| 4,054,684 | 10/1977 | Ceintrey et al. ...................... 422/54 |
| 4,086,054 | 4/1978 | Seibert ................................ 8/938 X |
| 4,341,565 | 7/1982 | Martenson ........................... 106/311 |
| 4,420,538 | 12/1983 | Nakamura et al. .................. 428/411 |
| 4,421,560 | 12/1983 | Kito ........................................ 106/21 |
| 4,425,161 | 1/1984 | Shibahashi et al. .................... 106/21 |
| 4,501,876 | 2/1985 | Zahr ..................................... 528/232 |
| 4,502,066 | 2/1985 | Satake et al. ......................... 346/209 |
| 4,540,999 | 10/1985 | Arai ..................................... 346/216 |

*Primary Examiner*—John F. Terapane
*Assistant Examiner*—Catherine S. Kilby
*Attorney, Agent, or Firm*—McGlew and Tuttle

[57] ABSTRACT

A thermochromic composition comprising (1) an electron-donating chromogenic material, (2) a 1,2,3-triazole compound, (3) a weakly basic, sparingly soluble azomethine or carboxylic acid primary amine salt, and (4) an alcohol, amide or ester serving as a solvent.

6 Claims, No Drawings

THERMOCHROMIC COMPOSITION

The present invention relates to a novel thermochromic composition which is useful for various industries.

Specific substances are known which, although colorless at a certain temperature, show a recognizable color when heated to a suitable temperature, or which have a color at room temperature but undergo a color change to colorless or to a different color at a higher temperature. Such thermochromic substances are incorporated into printing inks and coating compositions for various uses involving the necessity of temperature sensitive displays.

These specific substances and analogues thereof which exhibit a thermochromic effect include double salts comprising a transition metal, such as cobalt, nickel or manganese, and an aminic amide, such as hexamethylenetetramine. These double salts discolor on releasing water when heated and resume the original color on absorption of moisture when cooled. Other examples are mercury iodide, double complex salts of mercury iodide with other metallic iodides, heavy metal compounds such as lead chromate and ammonium metavanadate, organic compounds such as dixanthylen and bianthrone, some organic dyes and pigments, etc.

However, these compounds have one of the following drawbacks and are greatly limited in usefulness.
(1) High toxicity.
(2) Being active only in the presence of moisture.
(3) No optional selectivity in color change temperature and color.
(4) Color change to a similar color, hence indistinguishable.

Thermochromic substances further include cholesteric liquid crystals and mixtures of cholesteric liquid crystals and nematic liquid crystals, but these substances also find greatly limited use because they are low in color density, have no selectivity in color and in color change temperature and are very expensive.

Compositions are also known which undergo a color change (between formation of color and disappearance of color) owing to a suitable change in the ambient temperature and which comprise a normally colorless, electron-donating chromogenic material and an electron-accepting color developer such as attapulgite, kaolin, clay, zinc chloride, a phenol, zinc salicylate, aluminum benzoate or the like to utilize an electron donor-acceptor color forming reaction, these compositions further containing a solvent which is selected from among sparingly volatile solvents such as polyglycols, quaternary ammonium salts, nonionic surfactants and the like, alcohols, esters, ketones and acid amides.

These compositions have the following advantages.
(1) Chromogenic materials can be prepared for various colors for selective use.
(2) The chromogentic material gives a high color density and is therefore used in a relatively small amount economically.
(3) The composition is applicable directly to articles of any kind.
(4) Depending on the kind of solvent, the color change temperature can be set over a wide range of low to high temperatures.

Because of these advantages, the composition of the type described is thought to be most excellent at present.

Nevertheless, the composition has the following drawbacks.
(1) The color developers, especially phenols, which serve as one of the essential components, have very low resistance to oxidation in the atmosphere and exposure to sunlight and therefore gradually discolor or fail to serve as color developers, with the result that the composition incorporating the color developer seriously deteriorates with lapse of time.
(2) The solvent, another essential component, must be used in a very large amount to assure the desired thermochromic effect. This imposes limitation on the color density and the durability of the composition. In fact, the composition has very low resistance to solvents, washing and heat. However, if a reduced amount of solvent is used, a lower desensitizing effect will result, making it difficult to completely eliminate the color to permit the composition to exhibit an objectionable remaining color or to render the composition no longer thermochromic.

Because of the foregoing drawbacks, the conventional thermochromic materials are used for greatly limited applications only.

We have carried out extensive research to overcome the above drawbacks and found that when a 1,2,3-triazole compound is used as a color developer in combination with a weakly basic, sparingly soluble azomethine or carboxylic acid primary amine salt as a solvent, a novel thermochromic composition can be obtained with outstanding properties and free of the drawbacks heretofore experienced. The present invention has been accomplished based on this novel finding.

The present invention will be described in greater detail.

The present invention provides a thermochromic composition comprising (1) an electron-donating chromogenic material, (2) a 1,2,3-triazole compound, (3) a weakly basic, sparingly soluble azomethine or carboxylic acid primary amine salt, and (4) an alcohol, amide or ester serving as a solvent.

Examples of electron-donating chromogenic materials useful as the color component of the present composition are substituted phenylmethanes and fluorans such as 3,3'-dimethoxyfluoran (yellow), 3-chloro-6-phenylaminofluoran (orange), 3-diethylamino-6-methyl-7-chlorofluoran (vermilion), 3-diethyl-7,8-benzofluoran (pink), Crystal Violet lactone (blue), 3,3', 3''-tris(p-dimethylaminophenyl) phthalide (purplish blue), Malachite Green lactone (green), 3,3'-bis-(p-dimethylaminophenyl) phthalide (green) and 3-diethylamino-6-methyl-7-phenylaminofluoran (black), indolyl phthalides, spiropyrans, coumarins, etc. These materials are used singly, or at least two of them are used in admixture. The chromogenic material is used in an amount of 0.1 to 20% by weight based on the whole composition.

Examples of 1,2,3-triazole compounds, the second component characterizing the present invention, are 1,2,3-benzotriazole, 1,2,3-triazole ethyl 4-methyl-5-carboxylate, 4(5)-hydroxy-1,2,3-triazole, 5(6)-methyl-1,2,3-benzotriazole, 5(6)-chloro-1,2,3-benzotriazole, 5(6)-methoxy-1,2,3-benzotriazole, 4(7)-nitro-1,2,3-benzotriazole, 5(6)-carboethoxy-1,2,3-benzotriazole, 5-methoxy-7-nitro-1,2,3-benzotriazole, 4-amino-1,2,3-benzotriazole, 4-benzoylamino-1,2,3-benzotriazole, 4,5,6,7-tetrachloro-1,2,3-benzotriazole, 4-hydroxy-1,2,3-benzotriazole, naphtho-1,2,3-benzotriazole, 5,5'-bis-1,2,3-benzotriazole, 4(7)-sulfoanilino-1,2,3benzotriazole, 1,2,3- triazole diethyl dicarboxylate and the like. These triazole compounds are used singly, or at least two of them used in admixture. The triazole compound is used in an amount of 0.1 to 40% by weight based on the composition.

The triazole compounds useful for the present invention have a hydrogen atom on the nitrogen at the 1-position or 2-position. When the hydrogen atom is substituted with other organic group, thermochromism is not available, hence undesirable.

The foregoing 1,2,3-triazole compounds, unlike existing color developers, are not readily oxidized when exposed to the atmosphere or sunlight, or in the presence of heavy metal salts, are very stable and free of coloring and therefore exhibit fully stable properties when used for printing inks and coating compositions.

Azomethines useful as the third component of the present composition are represented by one of the following formulae (1) to (3) and can be easily prepared by mixing together an aldehyde and an amine corresponding to the desired structure, followed by dehydration.

R—CH=N—R'      (1)

R—CH=N—R'—N=CH—R      (2)

R—N=HC—R'—CH=N—R      (3)

wherein R and R' are each an aliphatic residue, substituted aliphatic residue, aromatic residue, substituted aromatic residue, heterocyclic residue or substituted amino group, each of the formulae including one of aromatic residue and substituted aromatic residue.

Examples of useful aldehydes include aromatic aldehydes such as benzaldehyde, tolualdehyde, anisaldehyde, cyanoaldehyde, chloraldehyde, cuminaldehyde, phenylacetaldehyde, heliotropin, citral, neral and vanillin, aliphatic aldehydes such as acetaldehyde, butyraldehyde, hexylaldehyde, palmitylaldehyde and stearylaldehyde, and dialdehydes such as glutaraldehyde, adipoaldehyde, terephthalaldehyde and glyoxal. Examples of useful amines which are reacted with such aldehydes include aromatic amines such as aniline, toluidine, cresidine, anisidine, napththylamine, chloroaniline, butylaniline and cyclohexylamine, aliphatic amines such as ethylamine, butylamine, laurylamine, myristylamine, palmitylamine, stearylamine, benzylamine and cinnamylamine, diamines such as ethylenediamine, stearylpropylenediamine, phenylenediamine, 1,6-diaminehexane, 1,8-diaminooctane and benzidine, and heterocyclic amines such as aminopyridine and aminoquinoline.

Sparingly water-soluble carboxylic acid primary amine salts are represented by the formula (4) below and can be easily obtained by reacting a carboxylic acid with a primary amine.

R—(COOH)$_x$· R'—(NH$_2$)$_y$      (4)

wherein R and R' are as defined above, and x and y are each an integer.

Examples of useful carboxylic acids include aliphatic carboxylic acids such as caprylic acid, capric acid, lauric acid, myristic acid, stearic acid, palmitic acid, linoleic acid, linolenic acid, oleic acid, behenic acid, enanthic acid, sebacic acid and azelaic acid, and aromatic carboxylic acids such as benzoic acid, p-chlorobenzoic acid, p-butylbenzoic acid, 1-naphthalenecarboxylic acid, cinnamic acid, phenylacetic acid, methacrylic acid, terephthalic acid, 2-furancarboxylic acid, 2-benzofurancarboxylic acid and cinchonic acid.

Examples of primary amines which are to be reacted with such carboxylic acids include aliphatic primary amines such as caprylamine, laurylamine, myristylamine, stearylamine, coconut amine, oleic amine and hexamethylenediamine, and aromatic amines such as butylaniline, chloroaniline, aniline, naphthylamine, phenylenediamine, dichlorobenzidine, aminothiazole and aminopyridine.

The azomethine or carboxylic acid primary amine salt is used in an amount of 0.5 to 50% by weight based on the composition.

Suitable solvents for use as the fourth component of the present composition are as follows. Examples of useful alcohols include saturated monohydric alcohols such as octyl alcohol, nonyl alcohol, decyl alcohol, dodecyl alcohol, tetradecyl alcohol, cetyl alcohol, octadecyl alcohol, ceryl alcohol and myricyl alcohol, and unsaturated alcohols such as geraniol, nerol, linalool and oleyl alcohol.

Examples of amides useful as solvents are acetamide, caprylic acid amide, lauric acid amide, lauric acid amide, myristic acid amide, stearic acid amide, oxystearic acid amide, bisstearic acid amide, acetoacetylamide, acetanilide, p-toluenesulfoamide, benzoic acid amide, salicylic acid amide, oxalic acid amide, phthalic acid amide, phthalimide, diethylurea, thiourea, diphenylurea and benzimidazole.

Examples of useful esters are stearic acid glyceride, lanolin, diphenyl phthalate, lauric acid glyceride, propyl laurate and palmitic acid glyceride.

The alcohol, amide or ester is used in an amount of 1 to 50% by weight based on the composition.

According to the present invention, useful solvents are limited to alcohols, amides or esters examples of which are given above, because melting points and softening points can be obtained systematically unlike other solvents. These solvents have such properties that the higher the boiling point, and the melting point or solidifying point, the higher is the temperature at which the color change occur and that those which are lower in these points permit a color change at a lower temperature. Accordingly the composition of the present invention can be set to a desired color change temperature over a wide range of from about −40° C. to about 150° C. to undergo a marked color change, which can be repeated reversibly with changes in temperature.

As will be apparent from the examples to follow, the present composition achieves exceedingly better results than the conventional thermochromic compositions. This is attributable to the following synergistic effects of the components.

(1) 1,2,3-Triazole compounds serving as color developers have high stability against oxygen in the atmosphere and exposure to sunlight.

(2) Azomethines and carboxylic acid primary amine salts, which are weakly basic and sparingly soluble and are not active on solvents at low temperatures, dissociate amines when heated, exihiting high desensitizing ability to eliminate color even when used in a small amount. Consequently conjoint use of these compounds with solvents which do not produce a desensitizing effect if not used in a large amount serves to greatly reduce the amount of solvent to be used and produces an improved desensitizing effect.

(3) The improved desensitizing effect thus produced permits coupling and uncoupling between the electron-donating chromogenic material and the color developer effectively to accurately repeat a reversible change from a color of high density to colorless.

(4) The reduction in the amount of solvent gives the composition increased resistance to solvents, washing, heat, etc. and assures economy.

The thermochromic composition of the present invention consists essentially of (1) an electron-donating chromogenic material, (2) a 1,2,3-triazole compound, (3) a weakly basic, sparingly soluble azomethine or carboxylic acid primary amine salt, and (4) an alcohol, amide or ester serving as a solvent. The composition is used in the form of a solution, emulsion, dispersion or encapsulated composition. The encapsulating method and the film forming material for capsules are not limited particularly. When required, the composition or the medium containing the composition may have further incorporated therein various chemicals such as surfactants, drying regulating agents, defoaming agents, resins, crosslinking agents, catalysts, viscosity adjusting agents, dyes, pigments, fluorescent whiteners, ultraviolet absorbers, ultraviolet stabilizers, infrared absorbers, extender pigments, water repellents, metal powders, glass particles, plastic particles, antioxidants, reduction preventing agents, electrolytes, reducing agents, oxidizing agents, acids, alkalis, disinfectants, chelating agents, dye carriers, perfumes, etc., organic compounds which are liquid at room temperature or thermally meltable solids such as isophorone, decalin, naphthalene, oils derived from petroleum, rape seed oil, paraffin wax, Japan wax, etc. amines, organic acids, phenols and the like.

When the thermochromic composition of the present invention is to be used, for example, for printing, the composition is dissolved or emulsified in a printing ink vehicle or is encapsulated and then admixed therewith. The resulting ink is then applied by a known printing method as by gravure, offset, flexso or screen printing or spraying with a spray gun to paper, synthetic resin film, glass, porcelain or china, leather or metal, whereby desired thermochromic patterns can be formed. Similarly the present composition is usable for textile printing or transfer printing and coating, as incorporated in a printing ink vehicle or other medium, to form such patterns on fabrics or other materials or articles.

Furthermore the present composition can be incorporated into waxes, synthetic resin, soaps, etc. or made into thermochromic moldings with or without a print thereof on a film.

For example, the thermochromic composition is usable for commercial goods such as color papers, picture books, towels, handkerchiefs, clothes, stickers, labels, china, glass products, plastics cups, etc. The composition can be applied to these articles by direct printing, transfer printing or knife coating. The composition may be applied by printing to synthetic resin films or expanded moldings (sponges or foams), which can be molded along with a base material into articles such as beach balls, swimming belts, buckets, cups and stirring rods for baths. The composition may be kneaded with waxes, synthetic resins or soap compositions, and the resulting mixtures molded into accessory dolls, toys or soaps. The composition may be applied to a fabric, which may then be used for covering other material by cutting and sewing to make stuffed dolls and animal toys, garments, artificial flowers, etc.

The composition of the present invention has the following advantages.

(1) The composition has high stability against oxygen in the atmosphere and exposure to sunlight and is resistant to solvents, washing, heat, etc.

(2) The use of the basic sparingly soluble azomethine or carboxylic acid primary amine salt in combination with a solvent reduces the amount of solvent to be used, is economical and affords an improved desensitizing effect.

(3) The composition undergoes a distinct color change to colorless because the color disappears owing to effective desensitization.

(4) The composition is adjustable to a desired temperature within a wide range of from about -40° C. to about 150° C. for a sharp color change and is therefore well-suited to a wide variety of uses including industrial applications.

The present invention will be described in greater detail with reference to the following examples, in which the parts are all by weight.

EXAMPLE 1

A colorless transparent coating ink was prepared from 10 parts of Ethocel #100 (brand name, adhesive for paper, product of the Dow Chemical Co.), 75 parts of ethyl alcohol, 0.3 part of Crystal Violet lactone, 4 parts of equimolar salt of myristic acid and octylamine, 4 parts of myristyl alcohol and 0.8 part of 1,2,3-benzotriazole. The ink was applied by an air knife coater to the entire surface of clay-coated paper (weighing 52 g/m$^2$) in an amount of 5 g/m$^2$ and then dried.

The coated paper was thermochromic, exhibiting a brilliant blue color at temperatures of up to 25° C. and turning to and remaining colorless at 33° C. and higher temperatures. The color change occurred reversely repeatedly. The paper was usable as toy color paper and also as a temperature sensor label with an adhesive applied to the rear side.

When the coating composition contains 72 parts of ethyl alcohol and 3 parts of Grow Pink MFB powder (brand name, daylight fluorescent pigment, product of Matsui Shikiso Chemical Co., Ltd.) in addition to the lactone, thermochromic coated paper can be obtained which is brilliant red at temperatures of not lower than 33° C. and brilliant purple at temperatures of up to 25° C.

EXAMPLE 2

A mixture of 50 parts of Malachite Green lactone, 80 parts of 4-hydroxy-1,2,3-benzotriazole, 25 parts of Tinuvin 326 (brand name, ultraviolet absorber, product of Ciba Geigy), 80 parts of equimolar salt of oleic acid and myristylamine, 350 parts of dodecyl alcohol and 100 parts of Epikote #828 (brand name, epoxy resin manufactured by Shell Chemical Co.) was placed into 1 liter of 6.5% aqueous solution of polyvinyl alcohol with stirring to obtain an emulsion containing oily droplets, about 10 to about 30 microns in diameter. After heating the emulsion to 65° C., 40 parts of Epikure U (brand name, epoxy resin curing agent manufactured by Shell Chemical Co.) was quickly added to the emulsion. The mixture was heated at 95° to 98° C. for 2 hours to obtain globular particles 15 to 35 microns in size.

Subsequently 30 parts of globular particles, 64 parts of Binder L (brand name, adhesive for pigment resin textile printing, product of Matsui Shikiso Chemical Co., Ltd.), 4 parts of Fixer F (brand name, crosslinking agent manufactured by Matsui Shikiso Co., Ltd.), 1 part of ammonium chloride and 1 part of ethylene glycol were uniformly mixed together to prepare a textile printing ink.

The ink was applied to a white satin fabric by screen printing with use of a screen (70 mesh) with a polka-dot pattern and heat-treated at 110° C. for 3 minutes. Consequently a thermochromic print was obtained which was colorless at temperatures of not lower than 10° C. but exhibited a brilliant blue polka-dot pattern at temperatures of up to 3° C. The printed pattern had colorfastness generally of at least grade 4 and was satisfactorily durable. Accordingly the printed fabric is usable for unusual clothes, especially for outer garments and underwear for women.

EXAMPLE 3

A printing ink comprising 20 parts of 25% emulsion polymerization product of ethyl acrylate and acrylic acid (9:1), 2 parts of sodium alginate, 5 parts of glycerin, 5 parts of urea, 1 part of silicone defoaming agent, 1 part of octyl alcohol and 66 parts of water was applied to the entire surface of kraft paper (weighing 130 g/m$^2$) to form a 0.2-mm-thick coating layer. The coating layer was then electrostatically flocked with rayon stable fibers (bright, 0.5 mm, 1.5 d) in an amount of 100 to 120 g/m$^2$ to form a uniform flock layer. The flock layer was then impregnated entirely with a printing ink with use of a screen (80 mesh) and then dried, the printing ink comprising 20 parts of globular particles, the same as those used in Example 2, and 80 parts of Binder 50 RL (brand name, adhesive for pigment resin textile printing, product of Matsui Shikiso Chemical Co., Ltd.).

Subsequently a printing ink composed of 98 parts of Matsuminsol F-23C (brand name, flocking adhesive manufactured by Matsui Shikiso Chemical Co., Ltd.) and 2 parts of ammonia water was applied to the flock layer with use of a screen (90 mesh) engraved with alphabet characters with a contour of 2 mm in diameter. Diamid Powder (brand name, nylon resin powder manufactured by Daicel Ltd.) was uniformly applied and deposited on the ink coating. After drying the coating, loose particles were removed from the background area of the print to obtain a heat tranfer flocked sheet bearing a reversed alphabet pattern.

The sheet was placed on knit cotton fabric with the adhesive layer in contact therewith, and the assembly was heat-treated by a hot press at 180° C. for 10 seconds. The base sheet was then removed. The alphabet pattern thus transferred onto the cotton fabric was colorless at temperatures of not lower than 10° C. but was brilliant blue at temperatures of up to 3° C.

The transfer sheet is useful for forming a temperature sensing one-point mark on winter garments such as training jackets and trousers, outer jackets, jogging pants, etc.

EXAMPLE 4

Globular particles were prepared in the same manner as in Example 2 except that 80 parts of benzylidenelaurylamine and 350 parts of myristyl alcohol were used in place of 80 parts of equimolar salt of oleic acid and myristylamine and 350 parts of dodecyl alcohol. A quantity of the globular particles (25 parts), 25 parts of stearic acid and 50 parts of paraffin wax (40° C.) were heated to obtain a homogeneous melt, which was placed into a mold having rod-shaped cavities and then cooled to obtain a brilliant green solid coloring material. The coloring material is usable for drawing desired patterns or marks on paper. The color disappears at 28° C. or higher temperatures.

The solid coloring material, which is thermochromic, is useful as a crayon or pastel for infants, and also for producing marks for sensing the heat built up in machinery.

EXAMPLE 5

Globular particles were prepared in the same manner as in Example 2 except that p-cumylbenzylidene p-anisidine, cetyl alcohol and Crystal Violet lactone were used in place of the equimolar salt, docecyl alcohol and Malachite Green lactone, respectively, in Example 2. A quantity of the particles (10 parts) and 90 parts of Sumikathene G804 (brand name, polyethylene resin pellets manufactured by Sumitomo Chemical Co., Ltd.) were mixed together and made into a brilliant blue container by injection molding at 120° C.

When hot water having a temperature of at least 40° C. is placed into the container, the color disappears instantaneously, whereas when cold water is poured in, the container resumes the brilliant blue color. The color change occurs reversely repeatedly. The container is useful as a cup or like tableware, or as a washbasin or like bathroom utensil.

EXAMPLE 6

To 35.5 parts of 10% aqueous solution of polyvinyl alcohol were added 2 parts of Red DCF (brand name, bluish red fluoran chromogenic material for pressure-sensitive manifold paper, product of Hodogaya Chemical Co., Ltd.), 4 parts of finely divided cetyl alcohol, 2 parts of equimolar salt of lauric acid and octylamine and 4 parts of 5-ethyl-1,2,3-benzotriazole, and the mixture was treated by a sand mill to obtain a dispersion. To the dispersion was added 30 parts of 10% aqueous solution of carboxymethylcellulose as an aqueous binder solution which is not compatible with the aqueous polyvinyl alcohol solution. When stirred for about 5 minutes, the mixture separated into two phases, portions of one phase floating on the other phase. Ten parts of 20% aqueous solution of industrial tannic acid was added to the two-phase mixutre, the mixture was stirred for about 1 minute, 4 parts of sodium chloride and 0.5 part of borax were added to the mixture, and the resulting mixture was stirred to obtain red particles on coagulation. The mixture was diluted with saturated aqueous solution of sodium chloride on the following day. The colored particles only were separated off by decantation, hardened with 5 parts of glutaraldehyde at an acidic pH, washed with water and dried.

The red particles thus obtained were 0.05 to 0.1 mm in diameter, were colorless at temperatures of not lower than 48° C. but took on a brilliant red color at temperatures of up to 35° C. The color change was reversible repeatedly.

Small pieces or thread-like strips of coated metal film, for example, can be prepared with use of the red particulate material by admixing the particulate material with an emulsion of polyacrylate to obtain an ink, applying the ink to a vacuum-evaporated metal film and cutting the coated film. These pieces or strips have a metallic gloss, undergo a color change between red and colorless repeatedly at varying temperatures and are useful for various applications.

EXAMPLE 7

Four parts of Nipporan #125 (brand name, polyol manufactured by Nippon Polyurethane Kogyo Co., Ltd.), 4 parts of methylene glycol acetate, 10 parts of cetyl alcohol, 5 parts of p-cumylbenzylidene p-anilide, 2 parts of Crystal Violet lactone and 4 parts of 1,2,3-benzotriazole were heated to obtain a solution, which was then placed into 200 parts of 6.5% aqueous solution of polyvinyl alcohol with vigorous agitation. The mixture was stirred at 50° C. for 8 hours and then allowed to stand overnight, giving a sediment of microcapsules, which were blue at room temperature. The capsules were filtered off and spontaneously dried (15 to 20 microns in particle size).

Next, 20 parts of microcapsules, 5 parts of Ethocel #100, 10 parts of vinyl chloride-ethylene copolymer and 65 parts of xylene were mixed together to obtain a printing ink, which was applied to a transparent polypropylene film (0.85 mm in thickness) by printing with use of a gravure plate (80 mm × 100 mm) bearing an animal silhouette pattern, followed by drying. The blank side of the film was electrostatically adhered to the inner surface of a container forming metal mold, and Noblen Y-100 (brand name, polypropylene resin, manufactured by Sumitomo Chemical Co., Ltd.) was heated and injected into the mold under pressure to obtain a molding integral with the film. In this way, a polypropylene container was obtained with the animal silhouette pattern which was colorless at temperatures of not lower than 10° C. but brilliant blue at temperatures of up to 3° C.

Similar moldings can be obtained with use of a vinyl chloride, polyethylene, polyester or other film in place of the above film.

EXAMPLE 8

Five parts of the same particulate material as used in Example 5 and 95 parts of a roughly divided soap composition containing a perfume were mixed together and molded into a shape of desired animal to obtain a toilet soap for children.

The soap is blue at room temperature but turns colorless when placed in hot water having a temperature of not lower than 43° C. When withdrawn from the hot water and exposed to cold water, the soap restores the blue color. The color change can be repeated many times as desired.

Further examples of the present invention are given below.

Thermochromic compositions were prepared from 12 parts of 4,4′,6′-tris(dimethylamino)triphenylmethane-2-lactone, 16 parts of 1,2,3-benzotriazole, 24 parts of p-cumylbenzylidene p-anisidine and 48 parts of each alcohol listed in Table 1 below. Blue color disappearing temperature of each composition is also listed in Table 1.

TABLE 1

| Alcohol | Color disappearing temperature (°C.) |
|---|---|
| Stearyl alcohol | 54 |
| Myristyl alcohol | 35 |
| Cetyl alcohol | 45 |
| Dodecyl alcohol | −1 |
| Lauryl alcohol | −17 to −18 |
| Decyl alcohol | −14 |
| Octyl alcohol | −40 |

Thermochromic compositions were prepared from 4 part of Crystal Violet lactone, 16 parts of 1,2,3-benzotriazole, 50 parts of myristyl alcohol and 30 parts of each azomethine listed in Table 2 below. Blue color disappearing temperature of each composition is also listed in Table 2.

TABLE 2

| Azomethine | Color disappearing temperature (°C.) |
|---|---|
| $C_6H_5CH=NC_{12}H_{25}$ (benzylidene lauryl alcohol) | 0 |
| $C_6H_4(O-CH_3)CH=NC_{12}H_{25}$ (o-methylbenzylidenelaurylamine) | 8 |
| $C_6H_5CH=NC_6H_4(P-CH_3)$ (benzylidene p-toluidine) | 17 |
| $C_6H_5CH=NC_{18}H_{37}$ (benzylidenestearylamine) | 28 |
| $C_6H_4(P-OC_3H_7)CH=NC_6H_4(P-OCH_3)$ (p-cumylbenzylidene p-anisidine) | 40 |
| $C_6H_4CH=NC_6H_4(P-OCH_3)$ (benzylidene p-anisidine) | 61 |
| $C_6H_4(P-OCH_3)CH=NC_6H_4(P-OC_2H_5)$ (p-methoxybenzylidene p-ethoxyaniline) | 110 |
| $C_6H_4(P-OCH_3)CH=NC_6H_4(O-OCH_3)$ (p-methoxybenzylidene o-anisidine) | 130 |

Thermochromic compositions were prepared from 4 arts of Crystal Violet lactone, 16 parts of 1,2,3-benzotriazole. 50 parts of myristyl alcohol and 30 parts of a carboxylic acid primary amine salt of each combination of carboxylic acid and amine listed in Table 3. Table 3 also shows blue color disappearing temperature of each composition and the melting point of each amine salt.

TABLE 3

| Carboxylic acid | Amine | M.p. (°C.) | Color disappearing temp. (°C.) |
|---|---|---|---|
| Capric acid | Octylamine | 52 | 36 |
| | Laurylamine | 59 | 44 |
| | Myristylamine | 60 | 47 |
| | Stearylamine | 62 | 48 |
| Lauric acid | Octylamine | 57 | 43 |
| | Laurylamine | 66 | 58 |
| | Myristylamine | 69 | 59 |
| | Stearylamine | 70 | 61 |
| Myristic acid | Octylamine | 51 | 33 |
| | Laurylamine | 72 | 57 |
| | Myristylamine | 75 | 66 |
| | Stearylamine | 78 | 67 |
| Stearic acid | Octylamine | 61 | 55 |
| | Laurylamine | 71 | 61 |
| | Myristylamine | 81 | 69 |
| | Stearylamine | 89 | 78 |
| Oleic acid | Octylamine | Up to 20 | −10 |
| | Laurylamine | 33 | 0 |
| | Myristylamine | 40 | 11 |
| | Stearylamine | 54 | 33 |
| Behenic acid | Octylamine | 71 | 55 |
| | Laurylamine | 77 | 61 |
| | Myristylamine | 79 | 69 |
| | Stearylamine | 87 | 78 |

What is claimed is:

1. Reversible thermochromic composition capable on heating of color change from colored to colorless state, comprising four components (1), (2), (3) and (4), each of which is individually different from the other three components, said four components comprising
   (1) an electron-donating chromogenic material,
   (2) a 1,2,3-triazole compound having a hydrogen atom at the 1 or 2 N-atom position thereof and which serves ad corresponding color developer for said chromogenic material for reversibly achieving the colored state, (3) a weakly basic, sparingly soluble azomethine or carboxylic acid primary amine salt, said azomethine being selected from the group consisting of compounds having the formulae

R—CH=N—R'

R—CH=N—R'—N—CH—R, and

R—N=HC—R'—CH=N—R

Wherein R and R' are each substituents selected from the group consisting of aliphatic, substituted aliphatic, aromatic substituted aromatic, heterrocyclic and substituted amino, the corresponding compound of each such formula including one of an aromatic or a substituted aromatic substituent, and said salt having the formula R—(COOH)$_x$. R'—(NH$_2$)$_y$ wherein R and R' are the same as defined above and x and y are positive integers, and (4) an alcohol, amide or ester serving as a solvent, each of said azomethine and said salt being capable of dissociating an amine therefrom upon heating, for achieving a desensitizing effect in the presence of said solvent for changing the composition from colored to colorless state.

2. Composition of claim 1 comprising by weight 0.1 to 20% of said chromogenic material, 0.1 to 40% of said triazole compound, 0.5 of said azomethine or said salt, and 1 to 50% of said solvent.

3. An article having applied thereto the thermochromic composition of claim 1.

4. Reversible thermochromic composition capable on heating of color change from colored to colorless state, consisting essentially of four components (1), (2), (3) and (4), each of which is individually different from the other three components, said four components consisting essentially of (1) elctron-donating chromogenic material, (2) a 1,2,3-triazole compound having a hydrogen atom at the 1 or 2 N-atom position thereof and which serves as corresponding color developer for said chromogenic material for reversibly achieving the colored state, (3) a weakly basic, sparingly soluble azomethine or carboxylic acid primary amine salt, said azomethine being selected from the group consisting of compounds having the formulae

R—CH=N—R'

R—CH=N—R'—N—CH—R, and

R—N=HC—R'—CH=N—R wherein R and R' are each substituents selected from the group consisting of aliphatic, substituted aliphatic, aromatic, substituted aromatic, heterocyclic, and substituted amino, the corresponding compound of each such formula including one of an aromatic or a substituted aromatic substituent, and said salt having the formula R—(COOH)$_x$. R'—(NH$_2$)$_y$ wherein R and R' are the same as define above and x and y are positive integers, and (4) an alcohol, amide or ester serving as a solvent, each of said azomethine and said salt being capable of dissociating an amine therefrom upon heating, for achieving a desensitizing effect in the presence of said solvent for changing the composition from colored to colorless state.

5. Composition of claim 4 consisting essentially of by weight 0.1 to 20% of said chromogenic material, 0.1 to 40% of said triazole compound, 0.5 to 50% of said azomethine of said salt, and 1 to 50% of said solvent.

6. An article having applied thereto the thermochromic composition of claim 4.

* * * * *